Nov. 1, 1927.   1,647,944
E. VILLASEÑOR
CANDY MOLD
Filed May 28, 1926   3 Sheets-Sheet 1

INVENTOR
EDUARDO VILLASEÑOR
by his attorneys
Howson and Howson

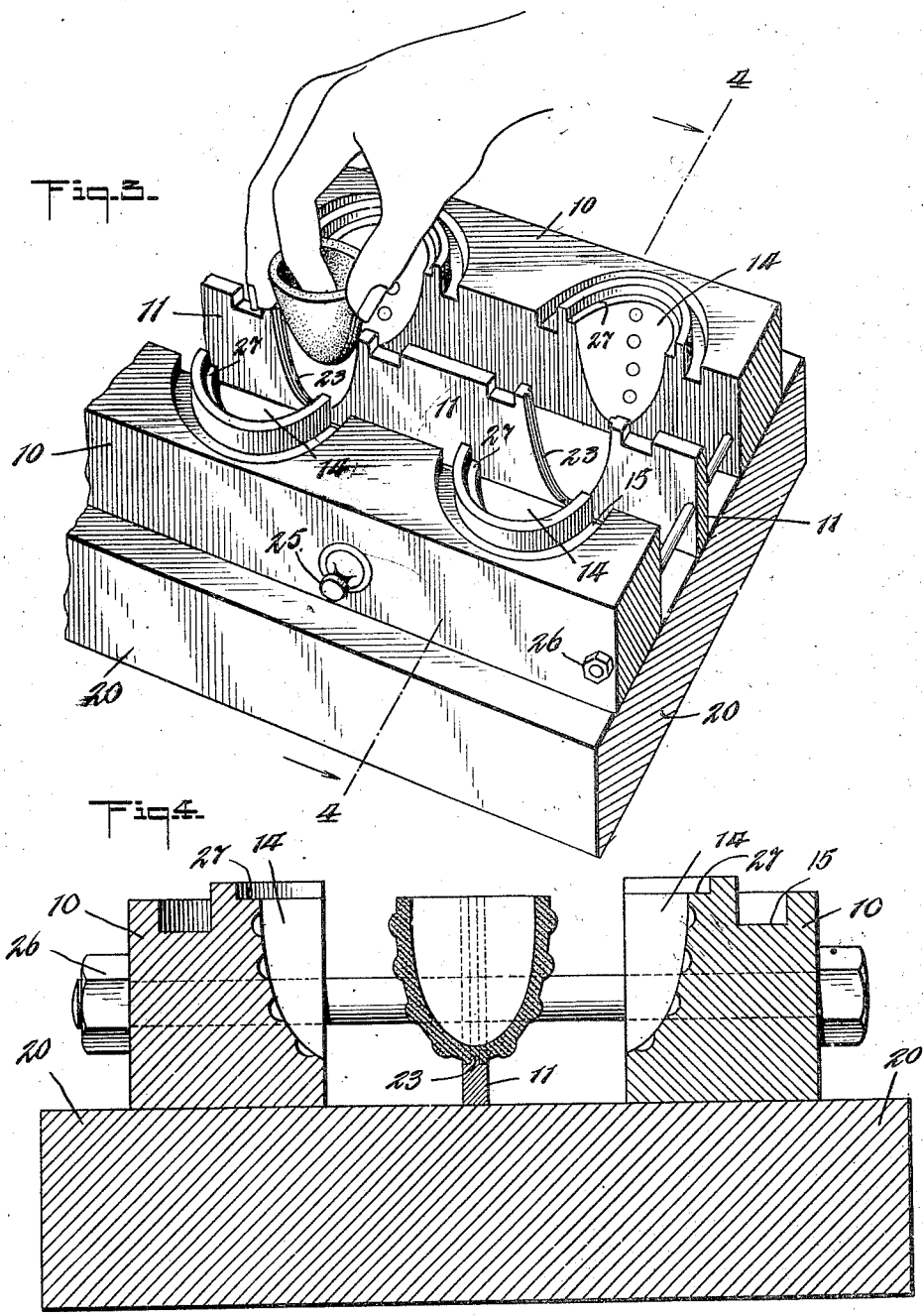

Nov. 1, 1927.
E. VILLASEÑOR
CANDY MOLD
Filed May 28, 1926
1,647,944
3 Sheets-Sheet 3
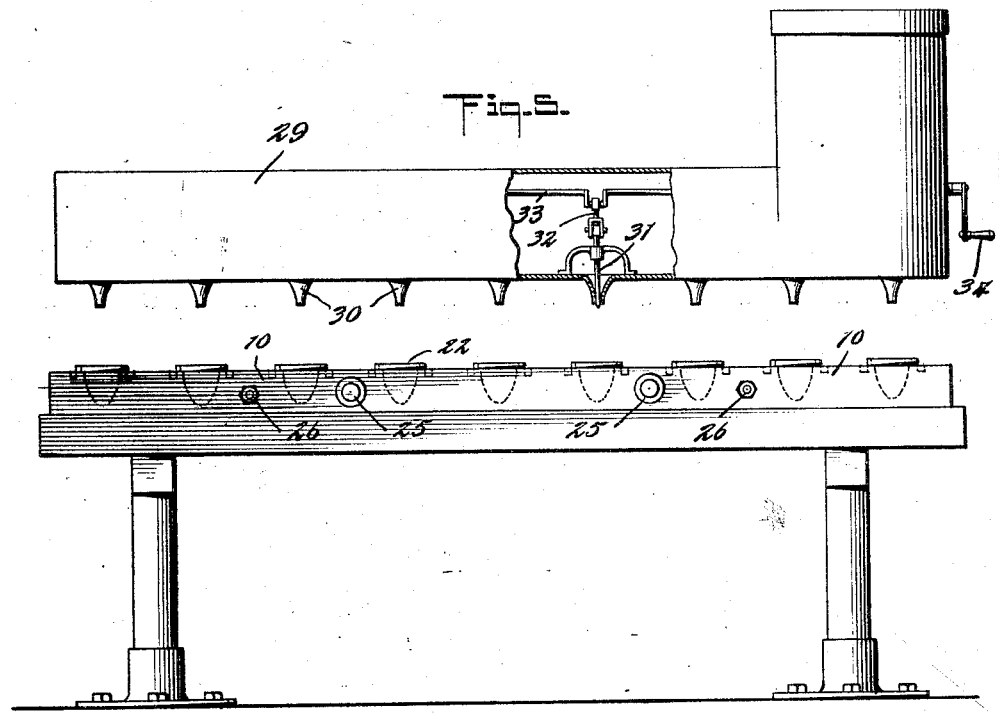
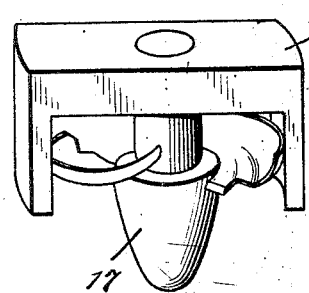
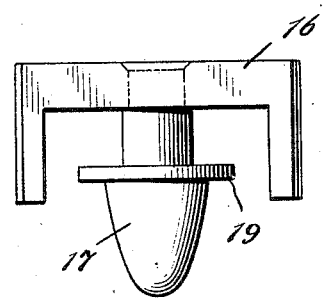
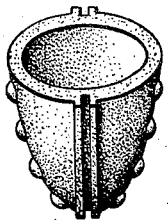
INVENTOR
EDUARDO VILLASEÑOR
by his attorneys
Howson and Howson Patented Nov. 1, 1927.

1,647,944

UNITED STATES PATENT OFFICE.

EDUARDO VILLASEÑOR, OF MERIDA, MEXICO, ASSIGNOR OF ONE-HALF TO RUDECINDO PENICHE, OF MERIDA, YUCATAN, MEXICO.

CANDY MOLD.

Application filed May 28, 1926, Serial No. 112,295, and in Mexico February 10, 1926.

My invention relates to candy molds and more particularly to apparatus for molding hollow forms of confections, such as ice cream cones or cups adapted to be joined together to form candy eggs, etc. One object of my invention is the formation of hollow forms of confections with rapidity and economy. Another object of my invention is to form such articles with a high degree of accuracy and another object of my invention is to permit the production of a large number of such articles rapidly with the minimum number of operators.

My invention will be shown and described in an embodiment adapted to make chocolate cups intended to be filled with ice cream, but it should be understood that my mold is adapted to make hollow confections of any form and dimension and from any other substances than chocolate, as for instance, "marzipan".

Figure 1:
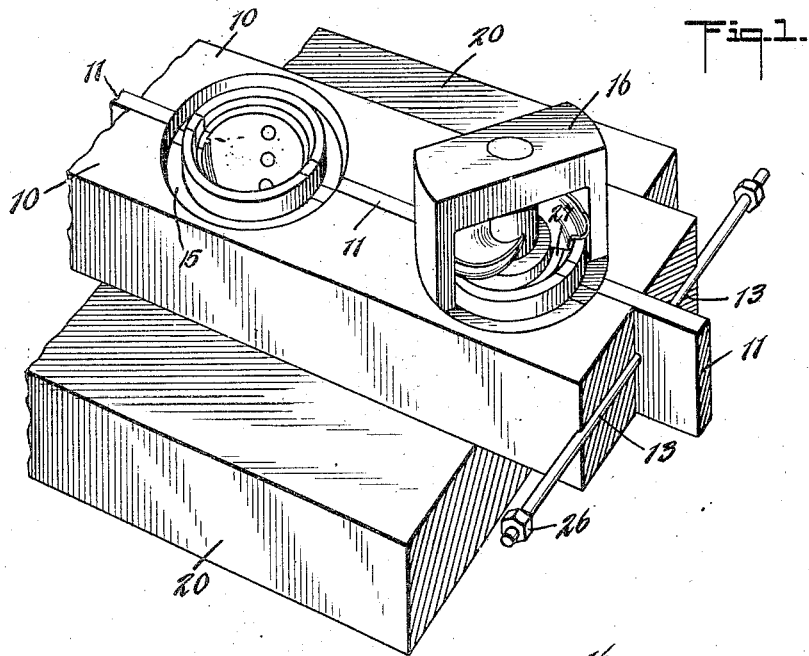
Fig. 1 is a perspective of a section of a series of molds in closed position with a core inserted in one of them.
Figure 2:
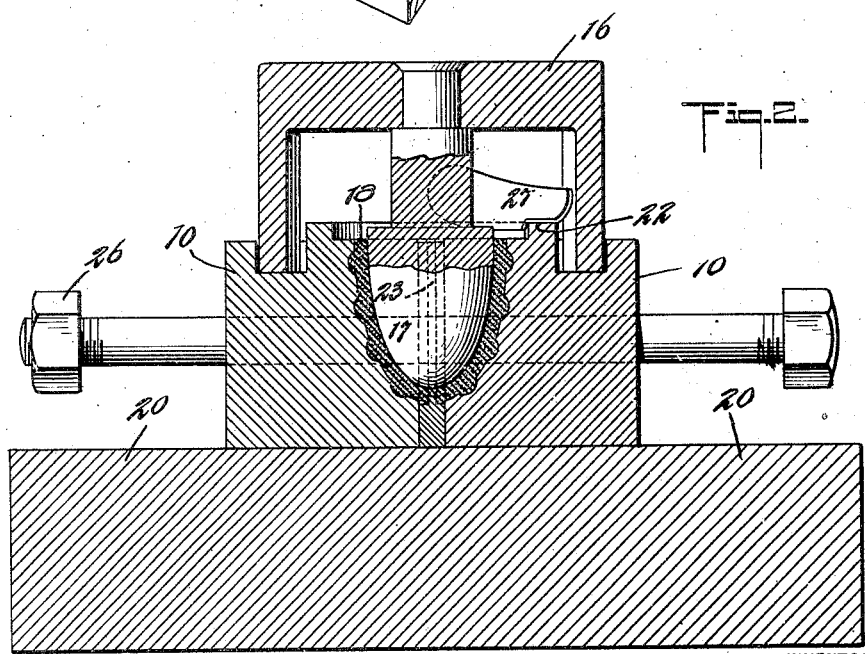
Fig. 2 is a vertical section through the mold and core showing the molded article.

Fig. 3 is a perspective view of a section of a series of molds in open position showing one of the finished articles being removed therefrom, Fig. 4 is a vertical section on the line 4—4 of Fig. 3 showing the finished article held in the center plate, Fig. 5 is a front elevation of a series of molds showing the means for pouring the chocolate into the molds, Fig. 6 is a perspective view of the core and its frame, Fig. 7 is a perspective view of the finished article, while Fig. 8 is a side elevation of a modified form of core.

One of the principal elements of my apparatus is an improved form of split mold consisting of two halves 10 separated vertically with a center plate 11 interposed between them.

The novel form of mold which I have invented has two halves 10, 10 with a thin center plate 11 about ¼ to ½ of an inch thick inserted edgewise between the two halves. The mold is open at the top and the mold cavity 14 is formed in the two halves and the central plate. The cavity has its largest circumference at the top of the mold and can be shaped to make any tapered form, such for instance as hemispheres, conoids, or cones as desired. The parts of the mold are held in alignment by horizontal bolts, the mold in the drawings being shown with two bolts fixed horizontally to either side of the central plate 11 sliding freely in openings 13 in the halves 10. These bolts are preferably near the edges of the mold in order not to interfere with the mold cavity. On the ends of these bolts I prefer to place nuts 26 or other retaining means adapted to determine the limit of movement of the halves 10. Each bolt should preferably be twice as long as the thickness of the half of the mold through which it passes. The mold rests on a support 20 having a smooth upper surface which assists in preserving the alignment of the parts of the mold. If desired the back half 10 can be made stationary with relation to the support 20 and it is then possible to open or close the mold completely by one continued movement of the front half 10. To make it more easy to grasp the front half of the mold a handle 25 is provided on the front thereof.

My purpose in providing a central plate between the two halves of the mold is to facilitate the efficient removal of the molded article. I propose to do this by shaping the edge of the plate 11 which forms part of the mold cavity in such manner that it is adapted to hold the molded article in position in the plate. The mold is opened and the halves are separated from the plate. When the mold is opened the operator can then lift the molded article out of the plate, thus avoiding all damage in the removal of articles from the mold. In the drawings I have shown a plate in which this is accomplished by means of cutting the edges of the plate edge back and thus making a rib 23 around the edge of the plate which forms part of the mold cavity 14. When the mold is closed, the cavity therefore has in it two narrow recesses running from one side of the mold down to the bottom and up to the other side of the mold and having between them this center rib 23. When the cup or cone is molded it will therefore have on it a pair of ribs as shown in Fig. 7, which ribs straddling the rib 23 on the plate tend to hold the molded article on the plate. It will be obvious that the mold can be shaped to provide designs on the molded article, if desired, such for instance, as the series of raised dots shown in Fig. 6.

As already explained, the purpose of this mold is to produce hollow articles, such as hemispheres, conoids, cones or other hollow tapering bodies and I shall now describe the means of making the molded article hollow. This is accomplished by the use of a core 17 rigidly suspended in a frame 16. This frame 16 carrying the core has two depending legs spaced from the core in the form of an inverted U-shaped yoke and the core and frame are adapted to be mounted on top of the mold in such manner as to provide a space 18 of uniform thickness between the mold and the core. To obtain this uniform spacing between the mold and the core I provide an annular recess or course 15 in the top of the halves and central plate of the mold, this annular course having as its center the center of the mold cavity. The depending legs of the frame 16 are adapted to fit in this annular course without lateral play but with sufficient freedom to permit revolution of the yoke. In this way the core is rapidly and easily positioned centrally and vertically.

If desired, the core 17 can be provided with a rim or flange 19 at its upper end which is adapted to rest on the upper edge of the mold cavity 14. (Fig. 7.) However, I prefer to substitute for this rim 19 a pair of rotating scrapers which assist in the rapid production of a perfect finished article as will be apparent from the following description. These scrapers bear against a raised border 22 around the mold and presenting sharp edges to that border tend to scrape off any surplus chocolate, thereby cutting away from the molded article all the surplus chocolate and making a smooth upper edge on the molded article. This scraping or cutting loose of surplus chocolate is obtained by the operator turning the frame and the core by hand. As the edges of the scrapers cut the surplus chocolate loose, the chocolate rides up the inclined surface of the scrapers and away from the finished article.

I have found that the operation of the scrapers can be improved by recessing the border of the mold about ⅛ of an inch for ⅛ to ¼ of an inch down from the top, providing a ledge or rim 27. The sharp edges of the scrapers are shaped to fit down on this ledge 27 and the vertical wall formed thereby, in addition to the flat top of the rim.

In several of the figures I have shown a section of my apparatus containing two molds side by side but by means of making the mold in the manner which has been described a long series of molds can be operated simultaneously by one operator. In Fig. 5 a short series of molds is shown with a container 29 having a reservoir and a distributing pipe with a spout 30 over each mold. Each spout is opened or closed by a plunger 31 lifted and lowered by a link 32 on a common shaft 33. The shaft is turned by a handle 34 on the end of the shaft and thus all the molds can be filled simultaneously. I have found that one operator can make many thousands of cups or cones in one day by means of my apparatus.

The operation of my mold is very simple. The series of molds are first partially filled with the liquid chocolate, marzipan or other paste by simultaneous operation of the valved openings from the end lever shown in Fig. 5. The molds are filled up to about ¼ of an inch from the top. The frames 16 are then placed in the annular courses 15, thus suspending the cores accurately in the mold cavities in a simple and efficient manner. When the confections have hardened, the operator grasps each frame 16 and turns it in the annular course 15, thus cutting off all surplus chocolate and at the same time giving a clean-cut edge to the cup or cone without subjecting the cup or cone to any harmful strain. This revolution of each frame and scrapers also revolves the cone, thus freeing that element from the confection. Each frame with its core and scrapers is then lifted out of the mold cavity. After all the cores are removed the front halves 10 of the series of the molds are pulled forward by means of the common handle 25. By thus pulling on the front halves of the molds they are separated from the central plate 11 and when the front halves have been pulled forward until they are in engagement with the nuts on the ends of the front bolts and the back halves are in engagement with the ends on the ends of the back bolts, the plate will also be separated from the back halves of the mold. This single movement opens all the molds simultaneously in a manner calculated to avoid harmful strain on the confections being molded.

The molded articles now rest in the central plates by virtue of the rib 23 on the central plate and the two ribs of the finished article. The operator then reaches in and lifts the finished article out of the center plate, as shown in Fig. 4. The hollow cups are now completed and can be filled with ice cream, sugar paste or any desired confection, or if the finished articles are desired for the formation of candy eggs, etc. two of the hemispheres, or conoids can be placed together and joined in the usual manner.

Variations will readily occur to those skilled in the art without departing from the scope of my invention.

I claim:

1. A confectionery mold split vertically into two halves, in combination with a plate inserted vertically therebetween, the mold cavity being open at the top and formed in the plate as well as the two halves, said plate being adapted to retain the molded article against lateral movement in either direction but permit removal vertically.

2. A confectionery mold split vertically into two halves, in combination with a plate inserted vertically therebetween and a separate core, the mold cavity being of its maximum horizontal circumference at the top and formed in the plate as well as the two halves, the edge of the plate which forms part of the mold cavity being cut to retain the molded article in the plate against lateral movement in either direction.

3. A confectionery mold split vertically into two halves and a central plate inserted therebetween, in combination with bolts fastened rigidly to said plate projecting horizontally at either side thereof and passing freely through the said halves, and nuts on the ends of the bolts, said plate being adapted to retain the molded article when the halves are separated therefrom.

4. A confectionery mold having two halves and a central plate inserted therebetween, in combination with bolts fastened rigidly to said plate projecting horizontally at either side thereof and passing freely through said halves, the mold cavity being open at the top and formed in the plate as well as the two halves, said plate being adapted to retain the molded article when the halves are separated therefrom.

5. A confectionery mold having two halves and a central plate inserted therebetween, in combination with a core and a frame carrying said core, said halves and central plate having an annular course in their upper surface in which the frame can be revolubly mounted, substantially as described.

6. A confectionery mold having two halves and a central plate inserted therebetween said halves and central plate containing the mold cavity and having an annular course in their upper surface centered on the mold cavity, in combination with a frame adapted to be revolubly mounted in the annular course and a core carried by said frame and a scraper associated with said core and frame, substantially as described.

7. A confectionery mold having two halves and a central plate inserted therebetween, the mold cavity being formed in the two halves and the central plate and said elements providing a flat rim around the top of said cavity, in combination with a frame adapted to be mounted on said halves and plate, and a core and a scraper associated with said frame, said scraper being adapted to engage said flat rim.

8. A confectionery mold having two halves and a central plate inserted therebetween, the mold cavity being tapered down from the upper face of the mold and being formed in the two halves and central plate, said halves and plate having a flat rim around said cavity and a depressed ledge inside said rim, in combination with a frame adapted to be mounted on said halves and central plate, a core mounted on said frame, and a scraper fixed to said core, said scraper being adapted to engage said rim and depressed ledge, substantially as described.

9. Confectionery molding apparatus comprising one element containing a plurality of halves of individual molds, and another element containing a plurality of cooperating individual molds in combination with a central plate adapted to be inserted between said two elements, the individual mold cavities tapering down from the upper faces of the molds and being formed in the two halves in the central plate, bolts adapted to hold said two elements and plate in alignment and a smooth surface on which said elements and plate rest, substantially as described.

In testimony whereof I have signed my name to this specification.

EDUARDO VILLASEÑOR.